United States Patent [19]

Eve

[11] 4,252,927

[45] Feb. 24, 1981

[54] PROCESS FOR POLYMERIZING 1-OLEFINS WITH A CHROMIUM-CONTAINING CATALYST AND A MODIFIER COMPRISING A TRIHYDROCARBYL ALUMINUM AND AN α-ω ALIPHATIC DIENE

[75] Inventor: Paul L. Eve, Polmont, Scotland

[73] Assignee: BP Chemicals Limited, London, England

[21] Appl. No.: 66,630

[22] Filed: Aug. 15, 1979

[30] Foreign Application Priority Data

Aug. 19, 1978 [GB] United Kingdom ............... 33958/78

[51] Int. Cl.$^3$ ................................................ C08F 4/24
[52] U.S. Cl. .................................... 526/105; 526/352; 526/903
[58] Field of Search ........................ 526/105, 106, 903

[56] References Cited

U.S. PATENT DOCUMENTS 3,351,623  11/1967  Walker et al. ....................... 526/105

FOREIGN PATENT DOCUMENTS 50-45079   4/1975  Japan.
51-112890 10/1976  Japan.
853414    11/1960  United Kingdom.
886784     1/1962  United Kingdom.
899156     6/1962  United Kingdom.
1398225    6/1975  United Kingdom.

Primary Examiner—Stanford M. Levin
Attorney, Agent, or Firm—Brooks, Haidt, Haffner & Delahunty

[57] ABSTRACT

Process for polymerizing ethylene or mixtures of ethylene with up to 40 weight % of other 1-olefin(s) by contacting the monomer with a catalyst (A) in the presence of a catalyst modifier (B), catalyst (A) being prepared by supporting chromium trioxide, or a chromium compound calcinable thereto, on a refractory oxide support material and heat activating, catalyst modifier (B) comprising (1) a trihydrocarbyl aluminum compound and (2) an α, ω-aliphatic diene containing a chain of at least 6 carbon atoms. The refractory oxide is preferably silica, alumina, zirconia, thoria or silica-alumina. The trihydrocarbyl aluminum compound is suitably an alkyl, aryl or alkaryl aluminum. The α,ω-diene is peferably 1,5-hexadiene or 1,7-octadiene. The polymerization is preferably carried out under particle form process conditions in a fluid medium.

11 Claims, No Drawings

PROCESS FOR POLYMERIZING 1-OLEFINS WITH A CHROMIUM-CONTAINING CATALYST AND A MODIFIER COMPRISING A TRIHYDROCARBYL ALUMINUM AND AN α-ω ALIPHATIC DIENE

The present invention relates to a process for polymerizing 1-olefins.

More particularly the invention relates to a process for polymerizing 1-olefins, for example ethylene, using a modified Phillips catalyst. Phillips catalysts have been extensively described in the literature. They are formed by supporting chromium trioxide, or a compound calcinable thereto, on a refractory oxide support material, for example silica, alumina, zirconia, thoria or silica-alumina and heating in a non-reducing atmosphere, preferably an oxidizing atmosphere to produce an active polymerization catalyst.

UK Patent specification No. 1,398,225 discloses a process for polymerizing ethylene by contacting the ethylene in the presence of hydrogen and at a temperature lower than 100° C., with a catalyst produced by reacting one or more aluminum trialkyls with one or more conjugated dienes to form a polymeric organoaluminum compound which is then reacted with chromium (VI) oxide deposited on an inorganic carrier and which has been heated to a temperature of from 300° C. to 1000° C.

Japanese Patent application No. 51/112890 discloses a catalyst for ethylene polymerization comprising (1) chromium oxide supported on silica and (2) the reaction product between a diolefin and a compound AlR$_3$ wherein R is hydrogen or hydrocarbon.

Japanese Patent application No. 50/45079 discloses a process for polymerizing olefins in a hydrocarbon diluent in the presence of a catalyst comprising a mixture of an organic aluminum compound and chromium oxide supported on silica characterized in that a third component which is a non-conjugated diene having the general formula R—CH=CH—CH$_2$—CH=CH—R$^1$ is introduced, wherein R,R$^1$ are hydrogen or alkyl.

It is an object of the present invention to provide a process for preparing polyethylene or ethylene copolymers having broad molecular weight distribution.

Accordingly the present invention provides a process for polymerizing ethylene or mixtures of ethylene together with up to 40 wt % based on total 1-olefin content of one or more other 1-olefins copolymerizable therewith comprising contacting the monomer under polymerization conditions with a catalyst (A) in the presence of a catalyst modifier (B), said catalyst (A) having been prepared by supporting chromium trioxide, or a chromium compound calcinable thereto, on a refractory oxide support material and heating to a temperature at least sufficient to produce an active catalyst, and said catalyst modifier (B) comprising (1) a trihydrocarbyl aluminum compound and (2) an α,ω-aliphatic diene containing a chain of at least 6 carbon atoms.

The monomer employed in the process of the present invention is ethylene or a mixture of ethylene with up to 40% by weight of one or more other 1-olefins which are copolymerizable with the ethylene under the reaction conditions employed.

Examples of suitable other 1-olefins are propylene, 1-butene, 1-pentene, 1-hexene and 4-methyl-1-pentene.

The chromium is introduced into the catalyst of the present invention by impregnating a refractory oxide support material with chromium trioxide or a compound calcinable thereto. Examples of suitable chromium compounds are chromium sesquioxide, chromic nitrate, chromic sulphate, chromic acetate, ammonium chromate, chromium carbonate, chromyl chloride and tertiary butyl chromate. Preferred are chromium trioxide itself, chromic acetate and tertiary butyl chromate. The quantity of chromium in the final catalyst is suitably in the range 0.2 to 30 wt %, preferably 0.3 to 5.0 wt %.

Examples of suitable refractory oxides which can be employed in the process of the present invention are silica, alumina, zirconia, thoria or composites thereof, for example silica-alumina. When the refractory oxide support material employed in the present invention is silica, it preferably has a mean particle diameter in the range 20 to 150 microns; and a surface area in the range 150 to 800 square meters per gram.

The supporting of the chromium compound on the refractory oxide support material can be achieved, for example, by dissolving a soluble chromium compound in a volatile liquid, impregnating the support material with the solution and evaporating the solvent; by impregnating the support with a liquid chromium compound, eg chromyl chloride; by passing the vapour of a volatile chromium compound, eg chromyl chloride, into a bed of the support material; or by mixing together a finely divided chromium compound and the support material in the presence of a small quantity of solvent, the quantity being insufficient to cause substantial agglomeration of the support material, continuing the mixing until a substantially homogeneous mix is obtained and then evaporating the solvent. Examples of solutions that can be used to impregnate the support material are chromium trioxide/water, ammonium chromate/water, chromium acetate/water, tertiary butyl chromate/hexane, chromyl chloride/chloroform.

The temperature to which the supported chromium compound must be heated to form an active polymerization catalyst (hereinafter referred to as the activation temperature) is at least 250° C. and not higher than the temperature at which the support commences to sinter. Preferably the activation temperature is in the range 400° to 900° C., most preferably 500° to 800° C. In general, the higher the activation temperature employed within the aforementioned ranges, the lower becomes the average molecular weight of polyolefin produced over the catalyst. The heating time is suitably within the range 5 minutes to 25 hours, preferably 30 minutes to 15 hours although times outside the broader range can be employed if desired.

It was formerly believed that to be an effective polymerization catalyst a "Phillips" catalyst must contain at least some chromium in hexavalent form. Whilst it is true that most, if not all, "Phillips" catalysts do not contain hexavalent chromium it is now believed that the olefin polymerization catalysis may operate through chromium in valency states below 6. Nevertheless it is desirable during the heat activation of catalysts of this type, including the catalyst employed in the process of the present invention, that conditions which favor the formation of, or retention of, chromium in the higher valency states should be employed. The heat activation is preferably carried out in a non-reducing atmosphere and most preferably in an oxidizing atmosphere or in vacuo. Dry air is an example of a suitable oxidizing atmosphere. The heat activation must be performed under anhydrous or dehydrating conditions and the activated catalyst must be protected from ingress of moisture.

The catalyst modifier employed in the process of the present invention comprises two components (1) a trihydrocarbyl aluminum compound and (2) an α,ω-aliphatic diene containing a chain of at least 6 carbon atoms.

The hydrocarbyl groups of the trihydrocarbyl aluminum compound are suitably alkyl, aryl, or alkaryl groups. The three groups attached to the aluminum atom may be the same or different hydrocarbyl groups. Examples of suitable trihydrocarbyl aluminum compounds are triethyl aluminum, triisobutyl aluminum and trioctyl aluminum. The quantity of trihydrocarbyl aluminum compound employed in the process of the present invention is suitably 0.1–20 moles, preferably, 0.5–10 moles, per gram atom of chromium in the catalyst. The quantity is preferably 0.04 to 2 millimoles of trihydrocarbyl aluminum per gram of catalyst (A).

The α,ω-diene employed in the process of the present invention contains a chain of at least 6 carbon atoms. Examples of suitable dienes are 1,5-hexadiene, and 1,7-octadiene.

The quantity of α,ω-diene employed in the present invention is suitably 10 to 5000 moles, preferably 100 to 1000 moles per gram atom of chromium in the catalyst. The quantity of α,ω-diene is preferably 0.05 to 5 moles per 100 moles of monomeric 1-olefin employed.

The polymerization process conditions of the present invention can be the so-called "solution form" or "particle form" process conditions which are well known in the art. In the "solution form" process the monomeric 1-olefin which is normally ethylene or a mixture of ethylene with up to about 40 wt % of other 1-olefins, is contacted with a suspension of the catalyst in a liquid hydrocarbon which is a solvent for the polymer at the polymerization temperature is employed. In the "particle form" process the monomeric 1-olefin is contacted with a suspension or a fluidized bed of the catalyst particles in a fluid medium under conditions such that the polymeric 1-olefin forms as solid particles suspended in or fluidized in the fluid medium. The fluid medium can be for example a liquid hydrocarbon or a gas. Examples of suitable liquid hydrocarbons are isobutane and n-pentane. Examples of suitable gases are nitrogen or argon mixed with the gaseous monomer, or the undiluted gaseous monomer.

In the present invention the conditions are preferably particle form process conditions and under these conditions the fluid medium is preferably a liquid hydrocarbon. Examples of suitable liquid hydrocarbons are paraffins or cycloparaffins having from 3–30 carbon atoms per molecule, for example isopentane, isobutane, cyclohexane. Most preferably the liquid medium is isobutane.

When a liquid medium is employed in the process of the present invention preferably the concentration of monomer therein is in the range 2–15 wt % although concentrations outside this range can be employed if desired.

When the polymerization conditions employed in the present invention are "particle form" the polymerization temperature is suitably in the range 50° to 112° C., preferably 80° to 110° C. The polymerization pressure is preferably in the range 2 to 100 bar when the fluid medium is a liquid and 1 to 60 bar when the fluid medium is a gas. The residence or reaction time can vary from a few minutes to several hours and is generally in the range 15 minutes to 3 hours.

The process can be conducted under batch or continuous polymerization conditions. Preferably the conditions are continuous.

Preferred apparatus for conducting the reaction under continuous particle form conditions in a liquid medium is described in UK Patent Specification No. 899,156.

For further details of examples of particle form process conditions and apparatus which can suitably be employed in the present invention, reference may be made to UK Patent Specification Nos. 899,156, 886,784 and 853,414.

The trihydrocarbyl aluminum and the α,ω-diene employed in the present invention can be introduced into the polymerization in admixture with or separately from the catalyst. If the polymerization is conducted in a liquid medium the catalyst modifier is preferably dissolved or suspended in some of this liquid prior to adding to the polymerization vessel.

If desired, the polymerization process of the present invention can be conducted in the presence of hydrogen gas to lower the average molecular weight of the polymer produced.

Methods of recovering polyolefins produced by solution form and particle form polymerization processes are well known in the art.

The polymerization process of the present invention is particularly useful for making polyethylene or ethylene copolymers having broad molecular weight distribution and low melt index.

The present invention is illustrated in the following Examples wherein Examples 1 and 2 are according to the invention and Example A is by way of comparison.

CATALYST PREPARATION 320 kg of a commercial chromia on silica catalyst (ID 969, W R Grace & Co) was heat activated in a 1.07 m diameter gas fired activator with a fluidizing air flow of 91 mm/s at about atmospheric pressure. The temperature of activation was held at 1350° F. (732° C.) for 5 hours. The catalyst recovery was 97%. The activated catalyst contained 0.94% by weight chromium. After activation the catalyst was stored and handled in a dry nitrogen atmosphere.

POLYMERIZATION

Bench scale polymerization was carried out in a 2.3 liter stainless steel stirred autoclave. The reactor was purged with nitrogen, baked out for 2 hours at 110° C. then cooled to polymerization temperature. Approximately 400 mg of the catalyst prepared as described above was charged to the reactor followed by the appropriate amounts (see Table) of triethylaluminum and diene in 1 liter of isobutane.

The reactor temperature was maintained at polymerization temperature and ethylene was added to bring the total pressure in the reactor to 41.4 bar. Ethylene was added continuously throughout the run to maintain this pressure.

Polymerization and polymer property data are shown in the Table, in which Example A is a Comparative Example not according to this invention.

It can be seen from a comparison of Examples 1 and 2 with Example A that modification of the catalyst with trihydrocarbyl aluminum and α,ω-diene containing at least 6 carbon atoms gives polymer of higher Kd, that is, of broader molecular weight distribution, than modification of the catalyst with trihydrocarbyl aluminum alone.

TABLE

| Example | Catalyst Modified With | Polymerization Temperature (°C.) | $MI_{21.6}$ | Kd |
|---|---|---|---|---|
| 1 | Triethyl aluminum (42 mg/g catalyst) + 1,5-hexadiene (8.8g/g catalyst) | 98 | 6.1 | 8.2 |
| 2 | Triethyl aluminum (42 mg/g catalyst) + 1,7-octadiene (8.8g/g catalyst) | 98 | 3.7 | 8.3 |
| A | Triethyl aluminum (42 mg/g catalyst) | 98 | 9.5 | 4.6 |

The Kd value was determined by a method similar to that given in Sabia, R J Applied Polymer Science, 1963, 7,347. $MI_{21.6}$ is the melt index measured by ASTM 1238 using a 21.6 kg load. The units are grams/10 minutes.

I claim:

1. A process for polymerizing ethylene or mixtures of ethylene together with up to 40 wt. % based on the total 1-olefin content of one or more other 1-olefins copolymerizable therewith comprising contacting the 1-olefin(s) under polymerization conditions with a catalyst (A) in the presence of a catalyst modifier (B), said catalyst (A) having been prepared by supporting chromium oxide, or a chromium compound calcinable thereto, on a refractory oxide support material and heating to a temperature at least sufficient to produce an active catalyst, and said catalyst modifier (B) comprising (1) from about 0.1–20 moles per gram atom of chromium in the catalyst of a trihydrocarbyl aluminum compound and (2) from about 10 to 5000 moles per gram atom of chromium in the catalyst of an $\alpha,\omega$-aliphatic diene containing a chain of at least 6 carbon atoms.

2. A process as claimed in claim 1 wherein the refractory oxide is silica.

3. A process as claimed in claim 1 wherein the catalyst (A) is activated at a temperature in the range 400° to 900° C.

4. A process as claimed in claim 1 wherein the hydrocarbyl groups of the trihydrocarbyl aluminum compound are alkyl groups.

5. A process as claimed in claim 1 wherein the quantity of trihydrocarbyl aluminum compound employed is in the range 0.5 to 10 moles per gram atom of chromium in the catalyst.

6. A process as claimed in claim 1 wherein the quantity of trihydrocarbyl aluminum compound employed is in the range 0.04 to 2 millimoles per gram of catalyst (A).

7. A process as claimed in claim 1 wherein the $\alpha,\omega$-diene is 1,5-hexadiene or 1,7-octadiene.

8. A process as claimed in claim 1 wherein the quantity of $\alpha,\omega$-diene is in the range 0.05 to 5 moles per 100 moles of monomeric 1-olefin employed.

9. A process as claimed in claim 1 wherein the polymerization is conducted in a fluid medium under conditions so that the polymeric 1-olefin forms as solid particles suspended in or fluidized in a fluid medium.

10. A process as claimed in claim 9 wherein the fluid medium is a liquid hydrocarbon or a gas.

11. A process as claimed in claim 9 wherein the fluid medium is osobutane or n-pentane and the polymerization temperature is in the range 50° to 112° C.

* * * * *